| United States Patent [19] | [11] 3,971,723 |
|---|---|
| Tajima et al. | [45] July 27, 1976 |

[54] GLASS FOR FARADAY ROTATOR ELEMENT

[75] Inventors: Hidemi Tajima, Tokyo; Yoshiyuki Asahara, Kanagawa; Tetsuro Izumitani, Tokyo, all of Japan

[73] Assignee: Hoya Glass Works, Ltd., Tokyo, Japan

[22] Filed: Sept. 12, 1974

[21] Appl. No.: 505,292

[30] Foreign Application Priority Data
Sept. 12, 1973 Japan............................ 48-102817

[52] U.S. Cl................................. 252/62.51; 156/54
[51] Int. Cl.²...................... H01F 1/00; C03C 3/04; C03C 3/08; C03C 3/30
[58] Field of Search.................. 252/62.51; 350/151; 106/54

[56] References Cited
UNITED STATES PATENTS

| | | |
|---|---|---|
| 3,318,652 | 5/1967 | Buger et al. .................... 252/62.51 |
| 3,420,601 | 1/1969 | Young et al. ....................... 350/151 |
| 3,484,152 | 12/1969 | Robinson ........................... 350/151 |

*Primary Examiner*—Patrick P. Garvin
*Assistant Examiner*—Mark Bell
*Attorney, Agent, or Firm*—Sughrue, Rothwell, Mion, Zinn & Macpeak

[57] ABSTRACT

Glass for use as an element of a Faraday rotator, consisting essentially of, by mol%, 10–30 $Tb_2O_3$, 10–30 $Al_2O_3$, and 30–80 $SiO_2 + B_2O_3$, with the proviso that $SiO_2 \geqq 15$ and $B_2O_3 \geqq 10$, and as optional components 0–5 $ZrO_2$, 0–1 $Sb_2O_3$, 0–1 $As_2O_3$, and 0–2 $AlF_3$. The glass has a large Verdet constant and a reduced absorption of light in the visible and infrared wavelength regions.

3 Claims, 4 Drawing Figures

GLASS FOR FARADAY ROTATOR ELEMENT

BACKGROUND OF THE INVENTION

1. Field of the Invention

This invention relates to a glass for an element of a Faraday rotator which has a large Verdet constant, and a reduced absorption of light in the visible and infrared light wavelength regions and which is stable as glass.

2. Description of the Prior Art

It is well known that glass containing large quantities of rare earth ions which exhibit paramagnetism has a large Verdet constant and is used as an element of a Faraday rotator. In particular, glass containing a $Tb^{3+}$ ion has a large Verdet constant and a reduced absorption of light in the visible and infrared wavelength regions, and the terbium ion in a high temperature glass solution retains its stable trivalent state. Accordingly, it is possible to obtain glass for a Faraday rotator element having a large Verdet constant and a reduced absorption of light in the above-mentioned regions by a simple melting method without the need to resort to any special melting method.

In order to increase the Verdet constant, the concentration of the $Tb^{3+}$ ion in the glass should be increased. Heretofore, a borate-type glass capable of containing a large quantity of the $Tb^{3+}$ ion has been used as a matrix glass. Increasing the $Tb^{3+}$ ion results in poor stability of glass same as in the case of other rare earth ions, and it becomes difficult to obtain homogeneous glass of a large size. Attempts have therefore been made to improve the stability of the glass by adding a small amount of $Al_2O_3$, ZnO or $SiO_2$, etc. However, when a large quantity of $Tb_2O_3$ is incorporated, conventional glasses cannot be expected to have such stability as to give homogenous and large-sized products.

SUMMARY OF THE INVENTION

This invention provides glass for use as an element of Faraday rotator, consisting essentially of, by mol%, 10–30 $Tb_2O_3$, 10–30 $Al_2O_3$, and 30–80 $SiO_2$ + $B_2O_3$, with the proviso that $SiO_2 \geq 15$ and $B_2O_3 \geq 10$, and as optional components 0–5 $ZrO_2$, 0–1 $Sb_2O_3$, 0–1 $As_2O_3$, and 0–2 $AlF_3$.

DETAILED DESCRIPTION OF THE INVENTION

Figure 1:
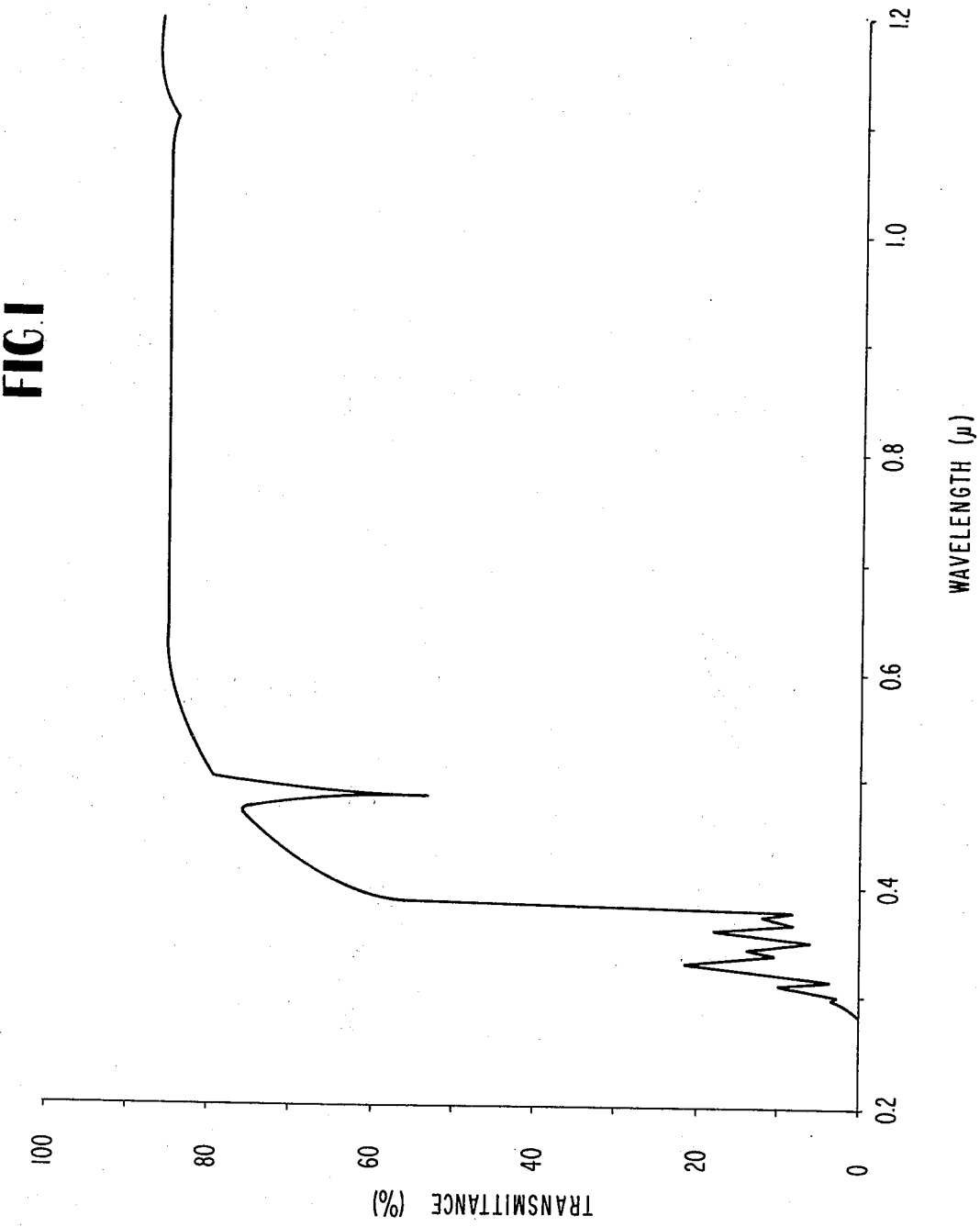
FIG. 1 shows a percent transmittance curve of the glass in Run No. 2 of the present invention.

The present invention is based on the discovery that by adding larger amounts of $SiO_2$ and $Al_2O_3$ than in the conventional glasses to form an alumino borosilicate glass, the liquidus temperature of the glass can be lowered with a decrease in the $Tb^{3+}$ ion concentration, and the viscosity of the glass can be increased. It has also been found that when a small amount of $ZrO_2$ is added to this alumino borosilicate glass, the liquidus temperature can be further decreased.

Although the terbium ion retains its trivalent state in a high temperature glass solution, a tiny amount of a $Tb^{4+}$ ion may be present when the amount of the trivalent ion increases. The presence of the tetravalent terbium ion causes the yellowing of the glass. However, if small amounts of $Sb_2O_3$, $As_2O_3$ and $AlF_3$ are added, all the terbium ions become trivalent and it is possible to remove the coloration and improve the percent transmittance of the glass on the short wavelength side.

If the proportion of $Tb_2O_3$ in the glass of this invention is above 30%, the glass is susceptible to devitrification. If it is less than 10%, the glass does not serve as a glass for a Faraday rotator element as contemplated in the present invention. If the proportion of $Al_2O_3$ is outside the range of 10 to 30%, the resulting product cannot be glass. If the proportion of $ZrO_2$ is above 10%, the glass becomes unstable. The proportion of $SiO_2$ + $B_2O_3$ as a glass-forming material is 30 to 80%. If either one of $SiO_2$ or $B_2O_3$ is too small in quantity as compared with the other, the liquidus temperature rises, and $Tb_2O_3$ cannot be incorporated in a great quantity. Accordingly, the following relations must be maintained: $SiO_2 \geq 15\%$, $B_2O_3 \geq 10\%$. $Sb_2O_3$ and $As_2O_3$ are sufficiently effective as decolorizing agents when used in an amount of not more than 1%, and so is $AlF_2$ when used in a proportion of not more than 2%. However, as in the case of ordinary decolorizing agents, they give better results when used in smaller amounts in view of their effects on the characteristics of glass intended to be improved, such as the Verdet constant.

Some examples of the present invention are shown in the following tables 1 to 4.

Table 1

| Run No. | Composition (mol%) | | | | Liquidus Temperature Tl (°C) | Transition Temperature Tg (°C) | Verdet Constant (min/oe.cm) | |
|---|---|---|---|---|---|---|---|---|
| | $Tb_2O_3$ | $Al_2O_3$ | $SiO_2$ | $B_2O_3$ | | | 6328A | −1.06μ |
| 1 | 15 | 20 | 32.5 | 32.5 | 1032 | 707 | −0.189 | −0.0620 |
| 2 | 20 | 20 | 30 | 30 | 1165 | 712 | −0.255 | −0.0840 |
| 3 | 25 | 20 | 27.5 | 27.5 | 1260 | 747 | −0.312 | −0.103 |

Table 2

| Run No. | Composition (mol%) | | | | Liquidus Temperature Tl (°C) |
|---|---|---|---|---|---|
| | $Tb_2O_3$ | $Al_2O_3$ | $SiO_2$ | $B_2O_3$ | |
| 4 | 25 | 20 | — | 55 | more than 1300 |
| 5 | 25 | 20 | 10 | 45 | more than 1300 |
| 6 | 25 | 20 | 22.5 | 32.5 | 1300 |
| 3 | 25 | 20 | 27.5 | 27.5 | 1260 |
| 7 | 25 | 20 | 37.5 | 17.5 | 1260 |
| 8 | 25 | 20 | 45 | 10 | 1300 |
| 9 | 25 | 20 | 55 | — | devitrified |

Table 3

| Run No. | Composition (mol%) | | | | Liquidus Temperature Tl (°C) |
|---|---|---|---|---|---|
| | $Tb_2O_3$ | $Al_2O_3$ | $SiO_2$ | $B_2O_3$ | |
| 10 | 25 | 10 | 32.5 | 32.5 | more than 1300 |
| 11 | 25 | 15 | 30 | 30 | 1300 |
| 3 | 25 | 20 | 27.5 | 27.5 | 1260 |
| 12 | 25 | 25 | 25 | 25 | 1270 |

Table 3-continued

| Run No. | Composition (mol%) | | | | Liquidus Temperature Tl (°C) |
|---|---|---|---|---|---|
| | $Tb_2O_3$ | $Al_2O_3$ | $SiO_2$ | $B_2O_3$ | |
| 13 | 25 | 30 | 22.5 | 22.5 | more than 1300 |

Table 4

| Run No. | Composition (mol%) | | | | | Liquidus Temperature Tl (°C) |
|---|---|---|---|---|---|---|
| | $Tb_2O_3$ | $Al_2O_3$ | $SiO_2$ | $B_2O_3$ | $ZrO_2$ | |
| 14 | 25 | 20 | 25 | 25 | 5 | 1240 |
| 15 | 25 | 20 | 22.5 | 22.5 | 10 | 1245 |
| 16 | 25 | 20 | 30 | 20 | 5 | 1245 |

Tables 1 to 3 relate to glasses of a four-component system composed of $Tb_2O_3$, $Al_2O_3$, $SiO_2$ and $B_2O_3$, and Table 4 relates to glasses of a five-component system which contains $ZrO_2$ in addition to the above four ingredients.

Table 1 shows the stability of each glass as against the content of $Tb_2O_3$. Since all of the glass compositions shown in Table 1 have a transition temperature of above 700°C, they can give homogeneous large-sized glass even if the liquidus temperature is not so low.

Table 2 shows the liquidus temperature of each glass as against the content of $SiO_2$ when the $Tb_2O_3$ content is constant at 25% and the $Al_2O_3$ content is constant at 20%. If the content of $SiO_2$ is small, the liquidus temperature is more than 1300°C. Even if the content of $B_2O_3$ is too low, the liquidus temperature becomes higher. This means that both of $SiO_2$ and $B_2O_3$ must be present at least in certain amounts. The liquidus temperature becomes lower in the case of alumino borosilicate glass.

Table 3 shows the variation of the liquidus temperature as against the content of $Al_2O_3$ when the content of $Tb_2O_3$ is constant at 25%. In this case, the liquidus temperature becomes lowest when the content of $Al_2O_3$ is 20 to 25. It can be confirmed that the composition is not vitrified when the $Al_2O_3$ content is less than 5% or above 35%.

Table 4 shows the liquidus temperature of each glass when $ZrO_2$ was used in place of a part of $B_2O_3 + SiO_2$. As can be seen by comparison with the runs in Table 2, the addition of a small amount of $ZrO_2$ could lower the liquidus temperature by about 15° to 20°C.

Figure 2:
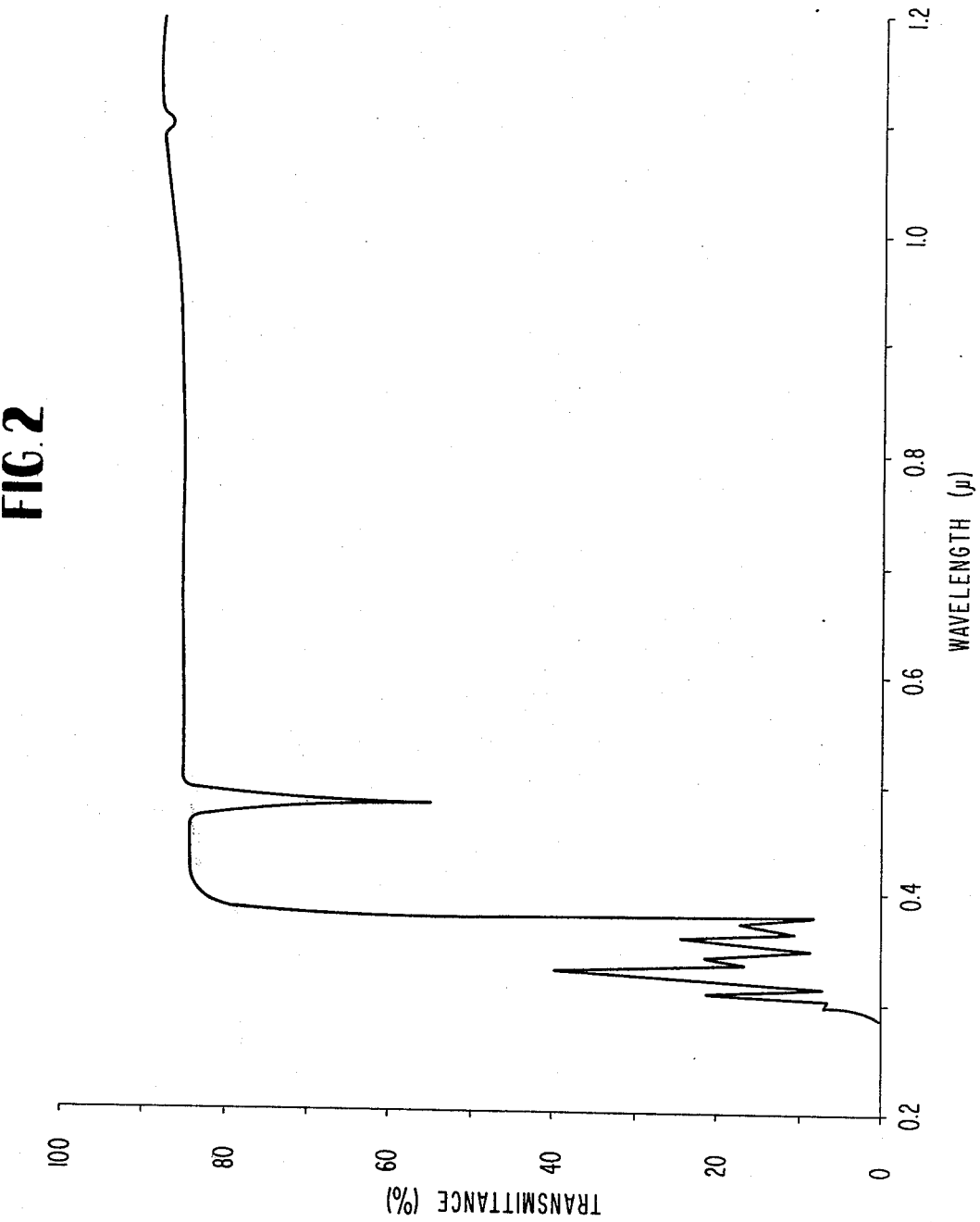
FIGS. 2, 3 and 4 are percent transmittance curves of glasses obtained by adding 0.5% of $Sb_2O_3$, $As_2O_3$ and $AlF_3$, respectively, to the glass of Run No. 2.
Figure 3:
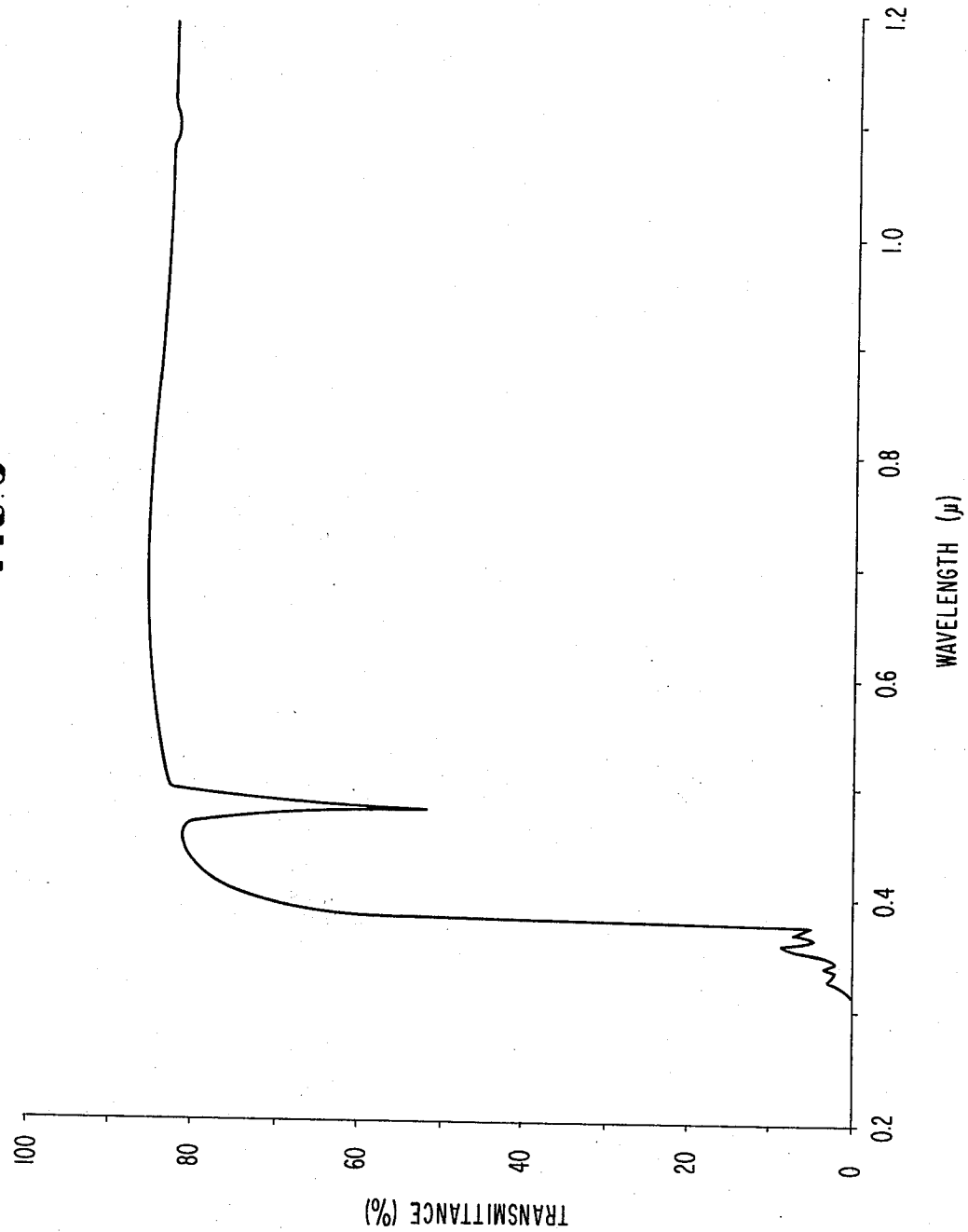
Figure 4:
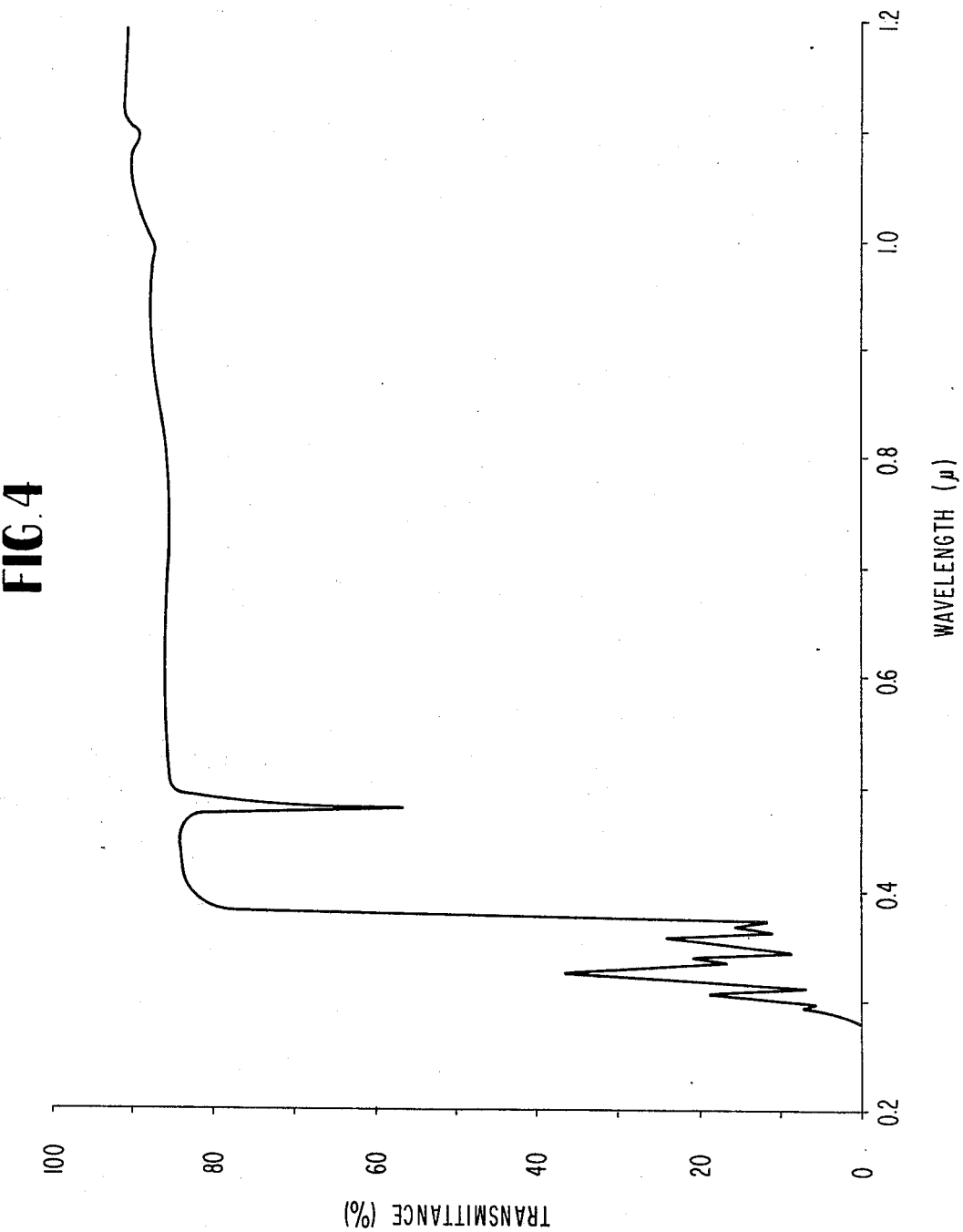

The decolorizing effect of $Sb_2O_3$, $As_2O_3$ and $AlF_3$ is demonstrated in the accompanying FIGS. 1 to 4. It is clear from a comparison of these figures that the percent transmittance of glass on the shorter wavelength side than 6000 A is improved in FIGS. 2 to 4. In other words, as a result of adding small amounts of $Sb_2O_3$, $As_2O_3$ and $AlF_3$, a decolorizing effect is produced, and the rising portion of the transmittance curve becomes sharp in FIGS. 2 to 4.

The glass of this invention can be obtained by formulating a glass batch of the above composition using $Tb_4O_7$ or $Tb_2(CO_3)_3$ as a material for $Tb_2O_3$, placing the batch in a platinum crucible, melting it at 1350° to 1450°C, lowering its temperature with stirring, and placing it in a mold to form it into glass.

While the invention has been described in detail and with reference to specific embodiments thereof, it will be apparent to one skilled in the art that various changes and modifications can be made therein without departing from the spirit and scope thereof.

What is claimed is:

1. In a glass for use as an element of a Faraday rotator, consisting essentially of, by mol%, 10 to 30 $Tb_2O_3$, 10 to 30 $Al_2O_3$, 0 to 5 $ZrO_2$, 0 to 1 $Sb_2O_3$, 0 to 1 $As_2O_3$, 0 to 2 $AlF_3$, $SiO_2$ and $B_2O_3$ to give a total of 100 mol%, the improvement being that the glass contains 30 to 80 $SiO_2$ plus $B_2O_3$ with the proviso that $SiO_2$ is more than or is equal to 15 and $B_2O_3$ is more than or is equal to 10.

2. The glass of claim 1, wherein said $Sb_2O_3$, $As_2O_3$ or $AlF_3$ has been added as 0.5 mol% percent of the total.

3. The glass of claim 1, wherein said $ZrO_2$ is added as 5 mol% of the total.

* * * * *